(12) United States Patent
Wang (10) Patent No.: US 10,677,364 B2
(45) Date of Patent: Jun. 9, 2020

(54) SWITCHABLE BIDIRECTIONAL CORE-ACTUATED VALVE

(71) Applicant: JINGWAY TECHNOLOGY CO., LTD., Yun Lin County (TW)

(72) Inventor: Feng-Chang Wang, Yu Lin County (TW)

(73) Assignee: JINGWAY TECHNOLOGY CO., LTD., Yunlin County (TW)

( * ) Notice: Subject to any disclaimer, the term of this patent is extended or adjusted under 35 U.S.C. 154(b) by 116 days.

(21) Appl. No.: 15/965,525

(22) Filed: Apr. 27, 2018

(65) Prior Publication Data

US 2019/0331239 A1    Oct. 31, 2019

(51) Int. Cl.
| | | |
|---|---|---|
| G05D 11/00 | (2006.01) | |
| F16K 11/044 | (2006.01) | |
| F16K 31/122 | (2006.01) | |
| F01P 7/14 | (2006.01) | |
| F01P 7/16 | (2006.01) | |

(52) U.S. Cl.
CPC .......... F16K 11/044 (2013.01); F16K 31/122 (2013.01); *F01P 7/165* (2013.01); *F01P 2007/146* (2013.01); *Y10T 137/2569* (2015.04)

(58) Field of Classification Search
CPC ......... Y10T 137/2569; Y10T 137/2572; Y10T 137/2567
See application file for complete search history.

(56) References Cited

U.S. PATENT DOCUMENTS

| | | | | |
|---|---|---|---|---|
| 1,686,310 A | * | 10/1928 | Beebe | F16K 11/044 137/113 |
| 2,440,478 A | * | 4/1948 | Kehle | B64C 13/00 137/113 |
| 2,445,505 A | * | 7/1948 | Ashton | F16K 11/065 137/113 |
| 2,551,045 A | * | 5/1951 | Parker | F16K 35/04 137/113 |
| 2,821,972 A | * | 2/1958 | Banker | F02M 37/0023 123/434 |
| 3,038,487 A | * | 6/1962 | Gardner | F16K 11/044 137/112 |
| 3,258,022 A | * | 6/1966 | Thompson | F15B 11/042 137/112 |
| 3,273,583 A | * | 9/1966 | Carlton | F16K 17/168 137/112 |
| 3,338,257 A | * | 8/1967 | Ferguson | F16K 11/0445 137/112 |

(Continued)

*Primary Examiner* — Robert K Arundale
(74) *Attorney, Agent, or Firm* — Sinorica, LLC (57) ABSTRACT

A switchable bidirectional core-actuated valve is provided with a chamber, and a first shaft hole, a second shaft hole and an output hole communicating with the chamber. The chamber is received therein with a non-return valve able to move in the chamber. Thus, water cooling liquid can make use of water pressure to have the non-return valve moving to a first position or a second position. When the non-return valve is at the first position, the first shaft hole will communicate with the output hole, when at the second position, the second shaft hole will communicate with the output hole. Thus, water cooling liquid can get into the chamber through the first shaft hole or the second shaft hole and then flow out of the output hole.

8 Claims, 8 Drawing Sheets

(56) References Cited

U.S. PATENT DOCUMENTS

| | | | | |
|---|---|---|---|---|
| 3,533,431 | A | * | 10/1970 | Kuenzel ................ F16K 11/044 137/113 |
| 3,815,622 | A | * | 6/1974 | Allen .................... B60K 17/10 137/112 |
| 4,253,481 | A | * | 3/1981 | Sarlls, Jr. ............. F16K 11/044 137/112 |
| 4,261,381 | A | * | 4/1981 | Geiling ................ B60G 17/033 137/101 |
| 6,318,400 | B1 | * | 11/2001 | Hope .................. G05D 16/103 137/111 |
| 2005/0028864 | A1 | * | 2/2005 | Thrash, Jr. ............. F16K 3/265 137/112 |
| 2010/0154896 | A1 | * | 6/2010 | Thrash, Jr. ............ F16K 11/044 137/112 |
| 2015/0362083 | A1 | * | 12/2015 | Patterson ............. F16K 11/044 137/12 |
| 2016/0281865 | A1 | * | 9/2016 | Morgan ................ F16K 11/044 |

* cited by examiner

SWITCHABLE BIDIRECTIONAL CORE-ACTUATED VALVE

BACKGROUND OF THE INVENTION

1. Field of the Invention

This invention relates to a non-return valve, particularly to a switchable bidirectional core-actuated valve.

2. Description of the Prior Art

Generally, a conventional non-return value has a valve body provided with a passageway for fluid to pass therethrough, and an inlet and an outlet communicating with the passageway. The passageway is formed with a conical hole received therein with a steel ball and a spring, which pushes the steel ball to resist the conical hole. Thus, fluid can get into the valve through the inlet, and when pressure of the fluid is larger than the elastic force of the spring, the pressure of the fluid will push the steel ball to keep away from the conical hole to enable the fluid to press through the non-return valve. On the contrary, when the fluid flows reversely from the outlet, the pressure of the fluid and the elastic force of the spring will form a multiplying effect to push the steel ball to close contact with the inner surface of the valve body for preventing fluid form flowing back.

However, when the non-return valve is connected with a pump, since the spring has an acting force; therefore, when fluid passes through the non-return valve, the pressure of the fluid will be weakened in strength and flow quantity, and since the interior of the valve body is under high pressure environment for a long period, the spring is apt to result in elastic fatigue to reduce, the spring is apt to result in elastic fatigue to reduce sealing effect and produce leakage. Therefore, having observed the above-mentioned drawbacks, the inventor of this invention thinks that the conventional non-return valve is necessary to be ameliorated and hence devises this invention.

SUMMARY OF THE INVENTION

The objective of this invention is to offer a switchable bidirectional core-actuated valve, which is able to carry out bidirectional switching of the route of water cooling liquid.

The switchable bidirectional core-actuated valve in the present invention includes a main body formed with a chamber, a first shaft hole, a second shaft hole and an output hole communicating with one another. A non-return valve is received in the chamber and provided with a core-actuating member, which has two ends respectively provide with a damping member corresponding to the first shaft hole and the second shaft hole. The non-return valve is able to move in the chamber and defined to have a first position and a second position. When the non-return valve is at the first position, the damping member will seal the second shaft hole, while the first shaft hole and the output hole will communicate with each other, and when the non-return valve is at the second position, the damping member will seal the first shaft hole, while the second shaft hole will communicate with the output hole.

The switchable bidirectional core-actuated valve of this invention is to have the non-return valve moved to the first position or the second position to permit water cooling liquid to flow into the chamber through the first shaft hole or the second shaft hole and then flow out via the output hole, thus attaining efficacy of bidirectional switching of water way.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
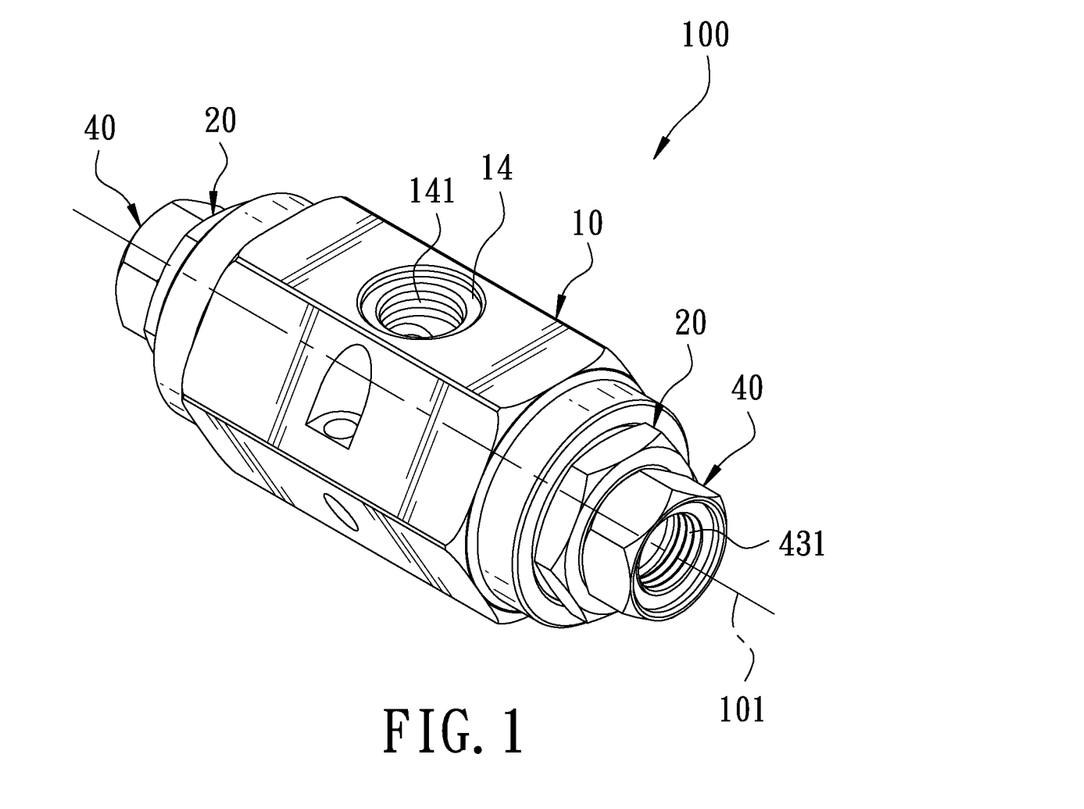
FIG. 1 is a combined perspective view of a switchable bidirectional core-actuated valve in the present invention.
Figure 2:
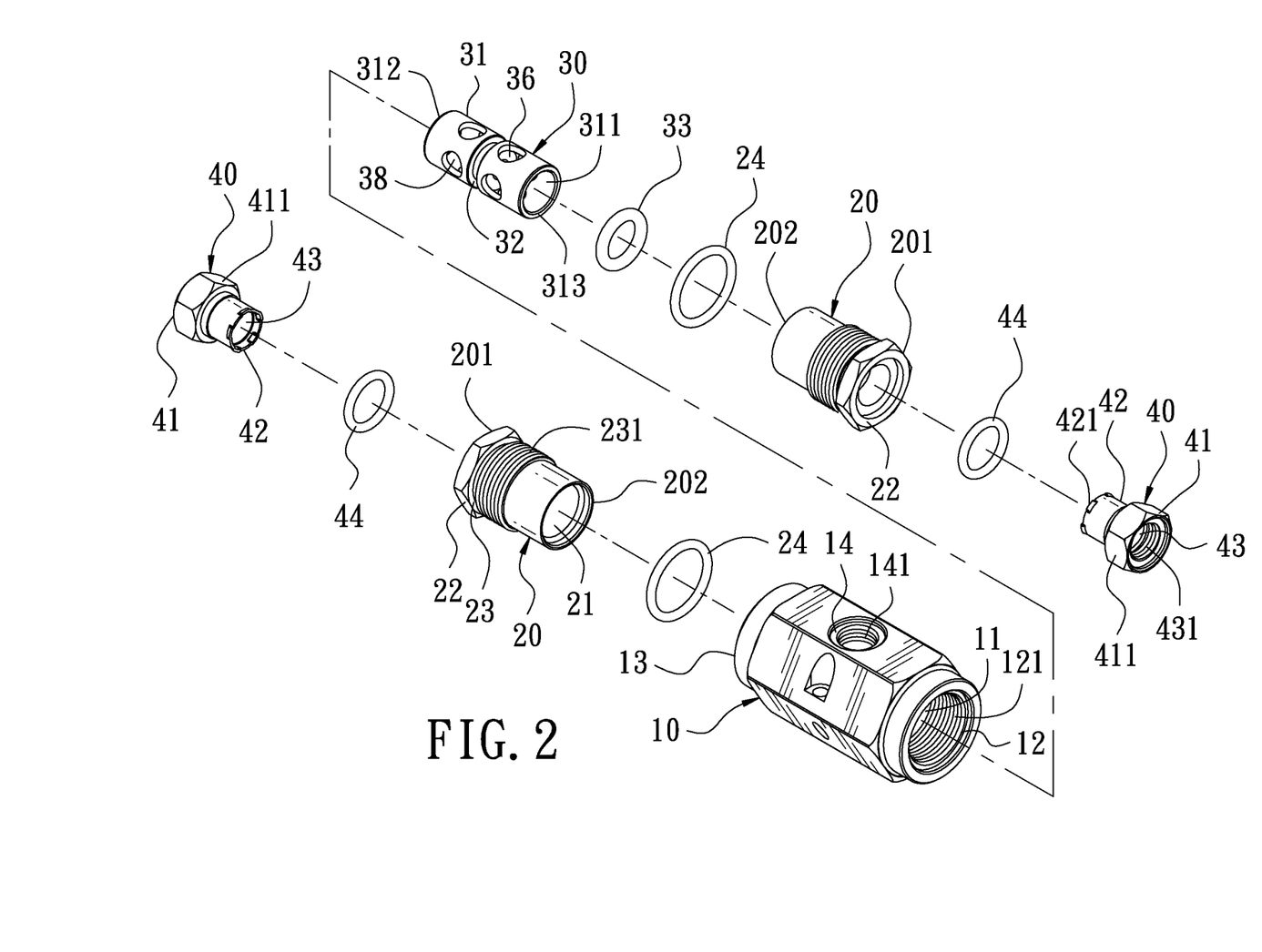
FIG. 2 is an exploded perspective view of the switchable directional core-actuated valve in the present invention.
Figure 3:
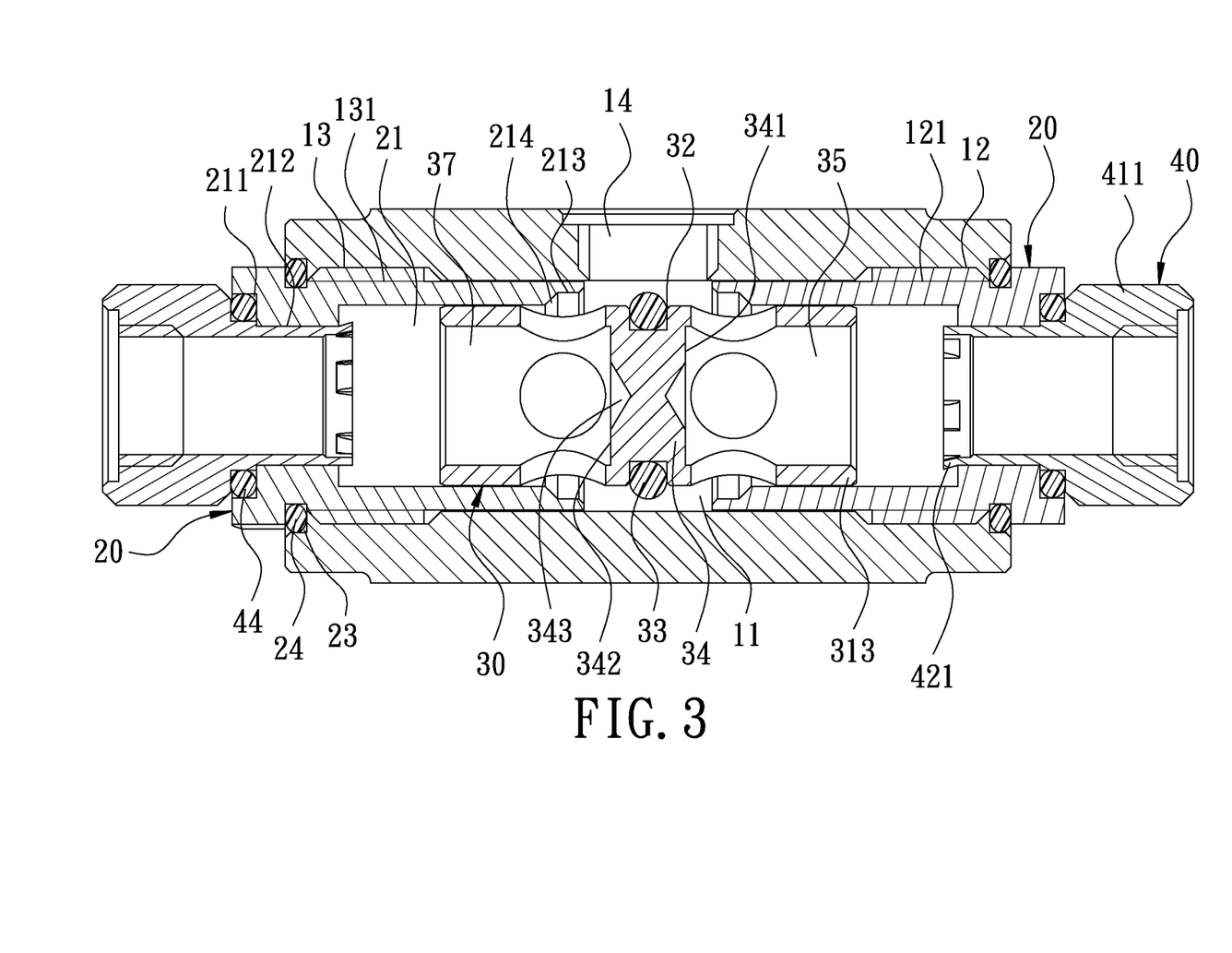
FIG. 3 is a cross-sectional view of the switchable bidirectional core-actuated valve in the present invention.

A preferred embodiment of a switchable bidirectional core-actuated valve 100 in the present invention, as shown in FIGS. 1, 2 and 3, includes a main body 10, two positioning stopper heads 20, a non-return valve 30 and two rotary connectors 40 as components combined together.

The main body 10 is provided with a chamber 11 containing a first shaft hole 12, a second shaft hole 13 and an output hole 14 communicating with one another. The first shaft hole 12 and the second shaft hole 13 are respectively formed at two opposite sides of the main body 10 and have their central axes positioned at the same axis 101. The first shaft hole 12, the second shaft hole 13 and the output hole 14 are respectively provided with female threads 121, 131, 141 at their openings.

The two positioning stopper heads 20 are respectively combined with the first shaft hole 12 and the second shaft hole 13. Each stopper head 20 is formed with a first end 201 and second end 202 and has an insert hole 21 formed between the first end 201 and the second end 202. Each positioning stopper head 20 has an outer circumferential wall of the first end 201 provided with a stopping member 22, and the external diameter of the stopping member 22 is larger than the internal diameter of both the first shaft hole 12 and the second shaft hole 13 so that the stopping members 22 can be respectively stopped at the first shaft hole 12 and the second shaft hole 13. Each positioning stopper head 20 has an outer circumferential wall beside the stopping member 22 bored with an annular recessed groove 23 received therein with a sealing ring 24 and further, each positioning stopper head 20 has an outer circumferential wall beside the recessed groove 23 provided with male threads 231 so that the two positioning stopper heads 20 can be respectively combined with the female threads 121 and 131 of the first shaft hole 12 and the second shaft hole 13 of the main body 10. The insert hole 21 is disposed with a stopping section 211 at the location of the first end 201, and the internal diameter of the stopping section 211 is larger than that of the insert hole 21. The insert hole 21 is further provided with a position-limiting section 212 beside the stopping section 211, and the position-limiting section 212 is smaller than the insert hole 21 in internal diameter. Furthermore, the insert hole 21 is formed with a positioning section 213 at the location of the second end 202 and the positioning section 213 of each positioning stopper head 20 is spaced apart, and the positioning section 213 is larger than the insert hole 21 in internal diameter. A diameter enlarged section 214 is disposed between the positioning section 213 and the insert hole 21, and the internal diameter of the diameter enlarged section 214 gradually increases toward the second end 202.

The non-return valve 30 is received in the chamber 11 of the main body 10 and positioned between the insert holes 21. The non-return valve 30 is formed with a core-actuating member 31, which has two ends respectively provided with a first opening 311 and a second opening 312 respectively corresponding with the first shaft hole 12 and the second shaft hole 13, and the first opening 311 and the second opening 312 of the core-actuating member 31 are respectively provided with a damping member 313 and in this preferred embodiment, the damping member 313 is the end face of two ends of the non-return valve 30. The size of the damping member 313 can be enlarged by reduction of the internal diameter of the first opening 311 and the second opening 312 in order to increase damping value. The core-actuating member 31 has an intermediate outer circumferential wall formed with a ring groove 32 having a positioning ring 33 fitted therein. Moreover, the core-actuating member 31 is set with a baffle plate 34 perpendicular to the axis, and the baffle plate 34 is formed with a first stopping face 341 and a second face 342 respectively corresponding to the first shaft hole 12 and the second shaft hole 13, and the first stopping face 341 and the second stopping face 342 are respectively provided with a conical notch 343. The non-return valve 30 has a first passageway 35 and three first insert holes 36 provided between the first opening 311 and the first stopping face 341 and communicating with first opening 311, the first passageway 35 communicating with the output hole 14 of the main body 10. The non-return valve 30 has a second passageway 37 and three second insert holes 38 formed between the second opening 312 and the second stopping face 342 and communicating with the second opening 312, the second passageway 37 communicating with the output hole 14. The non-return valve 30 can be moved in the chamber 11 and is defined to have a first position and a second position. When the non-return valve 30 is at the first position, the positioning ring 33 will be positioned at the positioning section 213 of the second shaft hole 13 and the baffle plate 34 will seal the second passageway 37, while the first shaft hole 12, the first passageway 35 and the output hole 14 will communicate with one another. When the non-return value 30 is at the second position, the positioning ring 33 will be positioned at the positioning section 213 of the first shaft hole 12 and the baffle plate 34 will seal the first passageway 35, while the second shaft hole 13, the second passageway 37 and the output hole 14 will communicate with the one another.

The two rotary connectors 40 are respectively combined with the two positioning stopper heads 20, respectively formed with a first end 41 and a second end 42 and having a through hole 43 formed between the first end 41 and the second end 42. Each rotary connector 40 has the first end 41 expanded outward radially to form a helical head part 411, which protrudes out of the insert hole 21 of the positioning stopper head 20, and the through hole 43 is provided with female threads 431 at the first end 41. The rotary connector 40 is further provided with a stopping ring 44 received in the stopping section 211 and sandwiched between the helical head part 411 and the stopping member 22. The second end 42 of the rotary connector 40 is received in the position-limiting section 212 and has an outer circumferential wall disposed with a plurality of spaced projections 421, which are inserted out of the position-limiting section 212 and engaged in the insert hole 21 to enable the rotary connector 40 to rotate in the position-limiting section 212.

Figure 4:
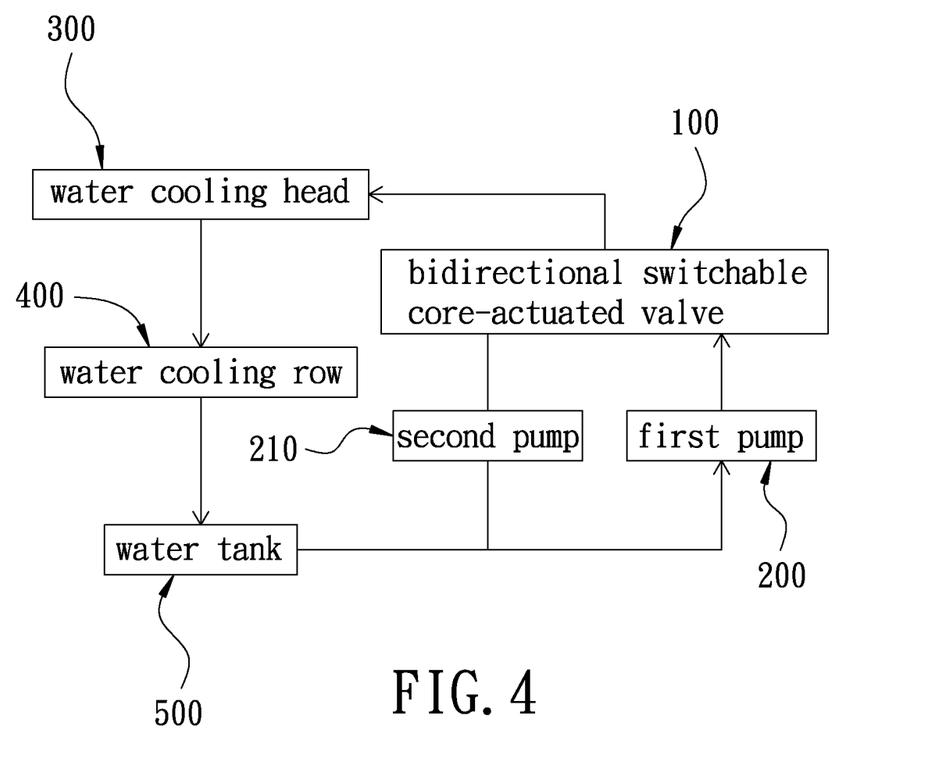
FIG. 4 is a block diagram of a water cooling system by applying the switchable bidirectional core-actuated valve in the present invention, showing a connection state of a first circuit.
Figure 5:
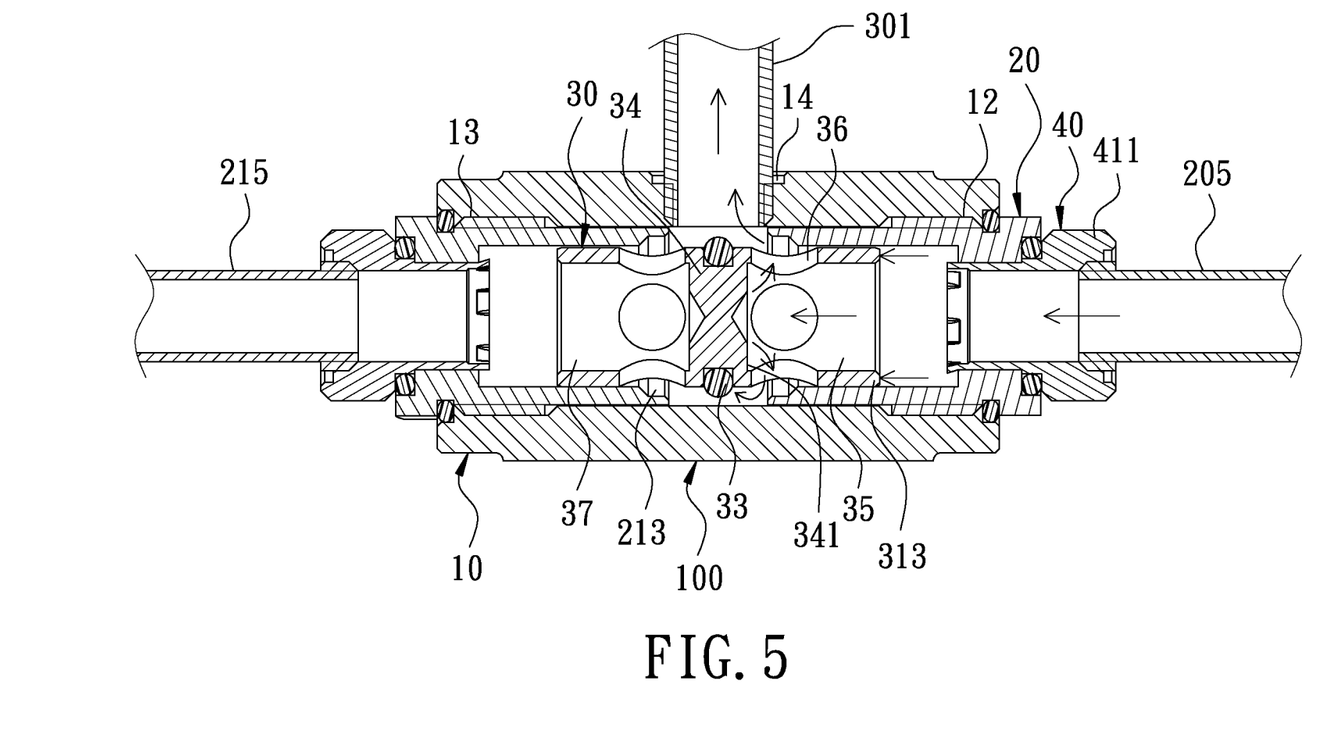
FIG. 5 is a schematic view in use of the switchable bidirectional core-actuated valve in the present invention, showing a state that water cooling liquid begins to flow into a chamber.
Figure 6:
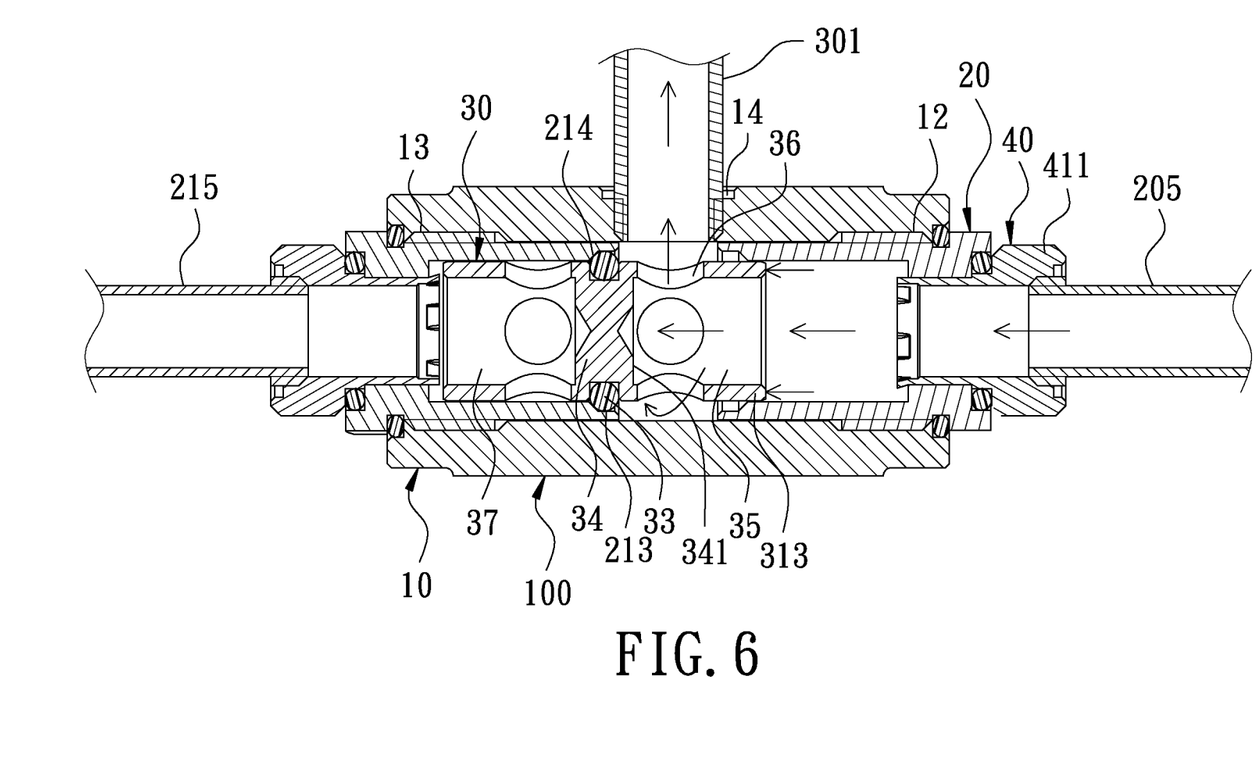
FIG. 6 is a schematic view in use of the switchable bidirectional core-actuated valve in the present invention, showing a state that the water cooling liquid flows into the chamber via a first shaft hole.

In assembly and use of the switchable bidirectional core-actuated valve 100, referring to FIGS. 4, 5 and 6, firstly, the helical head parts 411 of the two rotary connectors 40 are respectively connected with a first connecting pipe 205 and a second connecting pipe 215, and the first connecting pipe 205 has another end connected with a first pump 200, and the second connecting pipe 215 has another end connected with a second pump 210 and further, the output hole 14 is threadedly connected with a third connecting pipe 301, which has another end connected with a water cooling head 300. The water cooling head 300 is connected with a water cooling row 400, which is connected with a water tank 500 having water cooling liquid received therein and the water tank 500 is connected with both the first pump 200 and the second pump 210, thus, completing a water cooling system.

When the first pump 200 is started, the water cooling liquid will flow out of the first pump 200 and flow to the switchable bidirectional core-actuated valve 100 and meanwhile, the water cooling liquid will make use of water pressure to push the battle plate 34 of the non-return valve 30 and make the positioning ring 33 positioned at the positioning section 213 of the second shaft hole 13, letting the non-return valve 30 located at the first position, and since the internal diameter of the diameter enlarged section 214 is smaller than the external diameter of the positioning ring 33; therefore, the non-return valve 30 is impossible to move continuously. At this time, the baffle plate 34 will seal the second passageway 37, and the water cooling liquid will get in the chamber 11 through the first shaft hole 12 and flow to the first stopping face 341 and then flow out of the first insert holes 36 and flow to the output hole 14. Afterwards, the water cooling liquid will flow to the water cooling head 300 for lowering load temperature and, after flowing to the water cooling row 400 for carrying out heat dissipation, the water cooling liquid will flow back to the water tank 500 and finally will again flow into the first pump 200, thus forming a first circuit.

Figure 7:
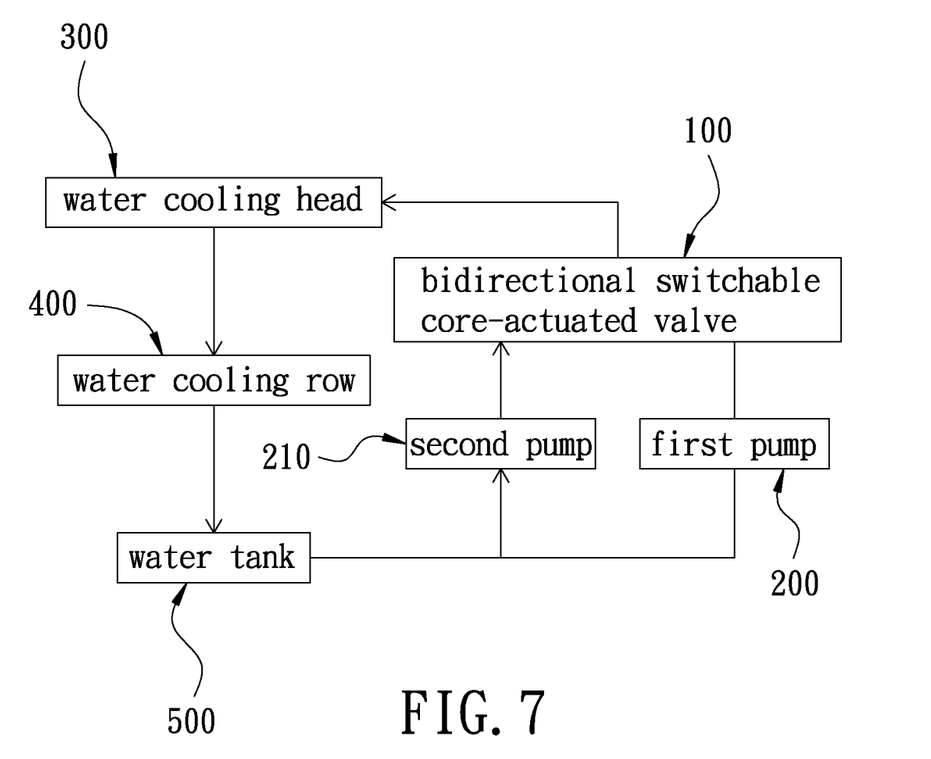
FIG. 7 is a block diagram of the water cooling system by applying the switchable bidirectional core-actuated valve in the present invention, showing a connection state of a second circuit.
Figure 8:
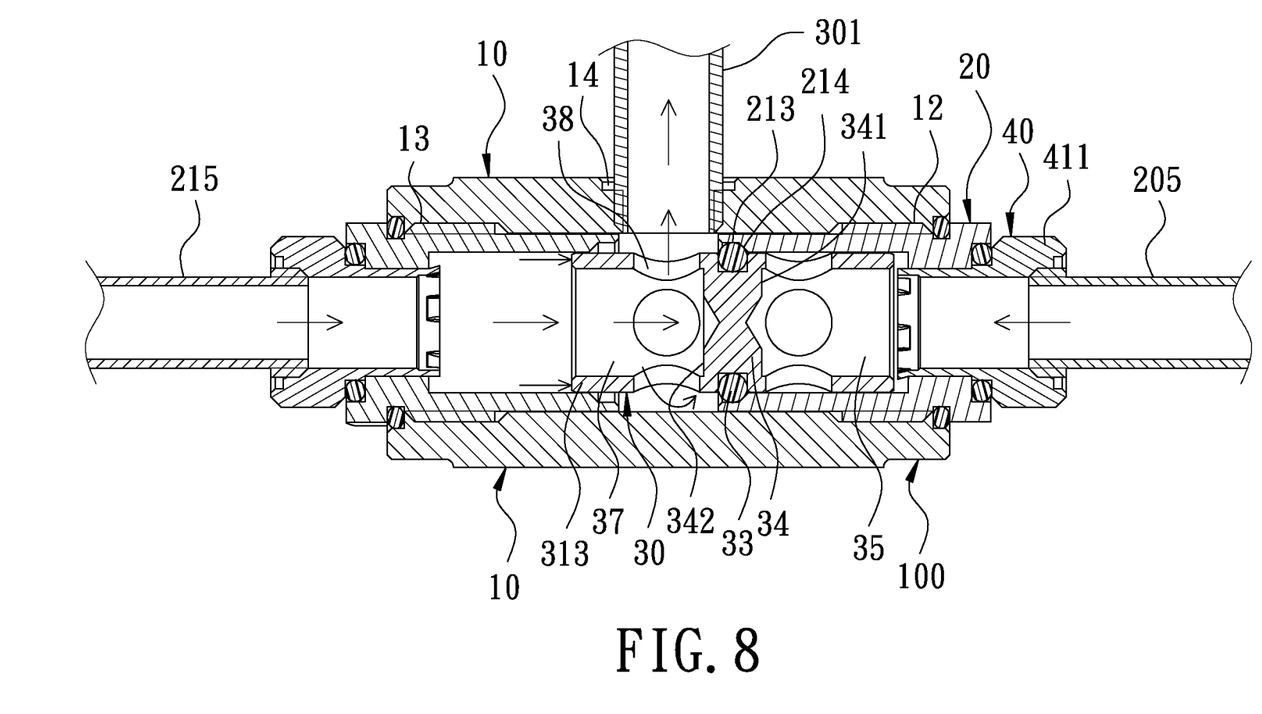
FIG. 8 is a schematic view in use of the switchable bidirectional core-actuated valve in the present invention, showing a state that water cooling liquid flows into the chamber through a second shaft hole.

Referring to FIGS. 7 and 8, when the water cooling system turns off the first pump 200 and starts the second pump 201, the water cooling liquid will flow out of the second pump 201 and flow to the switchable bidirectional core-actuated valve 100 to push the baffle plate 34 to actuate the non-return valve 30 to move and make the positioning ring 33 positioned at the positioning section 213 of the first shaft hole 12, letting the non-return valve 30 lie at the second position. At this time, the baffle plate 34 will seal the first passageway 35, and the water cooling liquid will get into the chamber 11 through the second shaft hole 13 and flow to the second stopping face 342 and then flow to the output hole 14 via the second insert holes 38. Subsequently, the water cooling liquid will flow to the water cooling head 300 for lowering load temperature, and, after flowing to the water cooling row 400 for carrying out heat dissipation, the water cooling liquid will flow back to the water tank 500 and lastly flow into the second pump 210 once more, forming a second circuit. Thus, when the first pump 200 or the second pump 210 gets trouble, another pump can be operated continuously, attaining effect of bidirectional switching of water way, enabling the water cooling system to be operated incessantly and unnecessary to be stopped and able to achieve best effect of heat dissipation.

One thing worth mentioning is that in the process when the water cooling system switches the first circuit or the second circuit, for instance, when switching from the first circuit to the second circuit, the first pump 200 is turned off and the second pump 210 is started to enable the second stopping face 342 and the damping member 313 to receive the water cooling liquid pushed by the second pump 210 and actuate the non-return valve 30 to move from the first position toward the second position. In the process of moving the non-return valve 30, both the second stopping face 342 and the damping member 313 will continuously receive the water cooling liquid and make the non-return valve 30 really moved and positioned to the positioning section 213 of the first shaft hole 12 to enable the water cooling system to operate successively and unnecessary to be stopped; therefore, the water cooling system can be operated incessantly to attain best effect of heat dissipation. Thus, the core-actuated valve 100 can attain effect of bidirectional switching by having the non-return valve 30 respectively receiving the water cooling liquid of the first pump 200 and the second pump 210 and then by employing the pressure imposed on the first stopping face 341 or on the second stopping face 342 as core-actuating mechanism.

When the water cooling liquid passes through the first stopping face 341 and the second stopping face 342, the water cooling liquid can flow along the slope of the conical notch 343 and then flow toward the first insert holes 36 and the second insert holes 38, able to reduce turbulent flow and enhance flow speed and flow quantity of the water cooling liquid.

Another thing worthy of mentioning is that the projections 421 of the rotary connectors 40 are inserted out of the position-limiting section 212 and engaged in the insert hole 21 to enable the rotary connectors 40 to rotate in the position-limiting section 212; therefore, the rotary connectors 40 can correspond with the angle of the first connecting pipe 205 and the second connecting pipe 215 to adjust its position for facilitating assembly of the switchable bidirectional core-actuated valve 100.

While the preferred embodiment of the invention has been described above, it will be recognized and understood that various modifications may be made therein and the appended claims are intended to cover all such modifications that may fall within the spirit and scope of the invention.

What is claimed is:

1. A switchable bidirectional core-actuated valve comprising:
   a main body formed with a chamber, said chamber comprising a first shaft hole and a second shaft hole and an output hole communicating with one another;
   a non-return valve received in said chamber, said non-return valve comprising a core-actuating member, said core-actuating member having two ends respectively provided with a damping member corresponding to said first shaft hole and said second shaft hole, said non-return valve able to move in said chamber and defined to have a first position and a second position, said damping member sealing said second shaft hole, while said first shaft hole communicating with said output hole when said non-return valve is at the first position, said damping member sealing said first shaft hole, while said second shaft hole communicating with said output hole when said non-return valve is at the second position; and
   wherein said first shaft hole and said second shaft hole are respectively inserted therein with a positioning stopper head, each said stopper head formed with a first end and a second end, an insert hole formed between said first end and said second end, each said positioning stopper head having an outer circumferential wall provided with a stopping member at a location of said first end, an external diameter of said stopping member being larger than an internal diameter of both said first shaft hole and said second shaft hole so that said stopping member can be respectively stopped at said first shaft hole and said second shaft hole, each said stopper head having an outer circumferential wall provided with a recessed groove beside said stopping member, said recessed grooves respectively mounted with a sealing ring, said insert hole provided with a stopping section at a location of said first end, an internal diameter of said stopping section being larger than an internal diameter of said insert hole, said insert hole formed with a position-limiting section beside said stopping section, said position-limiting section being smaller than said insert hole in internal diameter, said insert hole further provided with a positioning section at a location of said second end, said positioning section being larger than said insert hole in internal diameter, a diameter enlarged section disposed between said positioning section and said insert hole, said diameter enlarged section having an internal diameter gradually increased toward said second end.

2. The switchable bidirectional core-actuated valve as claimed in claim 1, wherein said insert hole of each said positioning stopper head is mounted with a rotary connector, said rotary connector formed with a first end and a second end, a through hole bored between said first end and said second end, each said rotary connector having said first end expanded outward radially to form a helical head part, said helical head part protruding out of said insert hole of said positioning stopper head, said through hole provided with female threads at said first end, said rotary connector further provided with a stopping ring, said stopping ring received in said stopping section, said stopping ring sandwiched between said helical head part and said stopping member, said rotary connector having said second end received in said position-limiting section, said second end of said rotary connector having an outer circumferential wall disposed with a plurality of spaced projections, said projections of said rotary connector inserted out of said position-limiting section and engaged in said insert hole to enable said rotary connector to rotate in said position-limiting section.

3. The switchable bidirectional core-actuated valve as claimed in claim 1, wherein said core-actuating member is bored with a recessed ring groove, said ring groove fitted therein with a positioning ring, said positioning ring being smaller than said positioning section in internal diameter, an external diameter of said positioning ring being larger than an internal diameter of said diameter enlarged section.

4. The switchable bidirectional core-actuated valve as claimed in claim 1, wherein said first shaft hole and said second shaft hole are respectively provided with female threads, while each said positioning stopper head has an outer circumferential wall beside said recessed groove provided with male threads, said positioning stopper heads able to be respectively combined with said female threads of said first shaft hole and said second shaft hole.

5. The switchable bidirectional core-actuated valve as claimed in claim 1, wherein said core-actuating member has two ends respectively formed with a first opening and a second opening respectively corresponding to said first shaft hole and said second shaft hole, said core-actuating member having said first opening and said second opening respectively provided with said damping member.

6. The switchable bidirectional core-actuated valve as claimed in claim 5, wherein said damping member is an end face of two ends of said non-return valve, a size of said damping member able to be enlarged by reducing the internal diameter of said first opening and said second opening for enhancing damping value.

7. The switchable bidirectional core-actuated valve as claimed in claim 1, wherein said core-actuating member is set with a baffle plate, said baffle plate formed with a first stopping face and a second stopping face respectively corresponding to said first shaft hole and said second shaft hole, said first shaft hole and said second shaft hole respectively provided at two opposite sides of said main body, said first shaft hole and said second shaft hole having their central axes positioned at the same axis, said non-return valve provided with said baffle plate perpendicular to said axis.

8. The switchable bidirectional core-actuated valve as claimed in claim 7, wherein said first stopping face and said second stopping face are respectively formed with a conical notch.

* * * * *